(12) United States Patent
Lee

(10) Patent No.: US 6,304,830 B1
(45) Date of Patent: Oct. 16, 2001

(54) AUTOMATIC KEYBOARD TESTING APPARATUS

(75) Inventor: Kevin Lee, Chung-Li (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/321,956

(22) Filed: May 28, 1999

(51) Int. Cl.⁷ ................................................. G01L 25/00
(52) U.S. Cl. .................... 702/114; 73/37; 73/865.9; 340/301; 340/302; 400/472; 702/114; 702/119; 702/120
(58) Field of Search .................... 73/37, 865.9; 400/472; 702/33–36, 41, 57, 68, 81–84, 98, 108, 113, 115, 116, 122, 124, 138–140, 182–185, FOR 103, FOR 104, FOR 123–126, FOR 134–135, FOR 143, FOR 170; 340/301, 302, 407.2

(56) References Cited

U.S. PATENT DOCUMENTS 3,597,981 * 8/1971 Wakayashi et al. ................ 73/865.9
3,768,622 * 10/1973 Wood ..................................... 73/37
5,501,518 * 3/1996 Woodward ............................ 702/120
5,827,983 * 10/1998 Ortoli .................................... 73/865.3

* cited by examiner

Primary Examiner—Arthur T. Grimley
Assistant Examiner—John Le
(74) Attorney, Agent, or Firm—Rosenberg, Klein & Lee

(57) ABSTRACT

An automatic keyboard testing apparatus includes a pair of support arms fixed to a machine frame for supporting a keyboard to be tested therebetween. A clamping device secures the keyboard between the support arms. A test module has testing units for operating/testing pushbuttons, a knob and indictors of the keyboard. A key actuating device comprises a plurality of key depressing elements movably mounted thereto. Each key depressing element forms a pressurized air stream outlet for applying a pressurized air stream to a corresponding key of the keyboard for actuating the key. A conveyor mechanism moves the key actuating device across the keyboard for sequentially actuating the keys of the keyboard. A keyboard coupling device electrically couples the keyboard to a processor-based determination device to receive signals therefrom for determining if the tested keyboard is properly functioning. A warning device is connected to the determination device for giving off a warning signal when the keyboard fails the test.

24 Claims, 7 Drawing Sheets

AUTOMATIC KEYBOARD TESTING APPARATUS

FIELD OF THE INVENTION

The present invention generally relates to an automatic apparatus for testing computer keyboard.

BACKGROUND OF THE INVENTION

Keyboards have been widely used as a man-machine interface between processor-based apparatus, such as personal computer, industrial controller and cash register, and users/operators for manually inputting instructions and data to the processor-based apparatus. The operation reliability is an important factor for a satisfactory performance of a keyboard. Thus, tests conducted before a keyboard is shipped to a user or a sale agent is very important. Conventionally, keyboards are tested manually. In other words, an operator sequentially depresses and actuates each key or pushbutton of the keyboard to see if the keyboard generates a correct responsive signal. Such a manual test is inefficient and laborious. Furthermore, striking forces that the operator applies to the keys of the tested keyboard may be different from key to key resulting in fault test result.

Besides, there are a variety of keyboards available in the market and a keyboard manufacturing shop may need to manufacture several kinds of keyboard. Therefore, a testing operator has to acquaint himself or herself with different key layouts of the keyboards when different keyboards are manufactured. This complicates the test and quality control operation of the keyboard manufacture.

Thus it is desired to have an automatic keyboard testing apparatus which overcomes the problems discussed above.

SUMMARY OF THE INVENTION

Accordingly, an object of the present invention is to provide an automatic keyboard testing apparatus which performs automatic testing process on keyboards thereby providing an efficient and effective quality control of the keyboards.

Another object of the present invention is to provide an automatic keyboard testing apparatus which facilitates reducing the likelihood of fault test result.

A further object of the present invention is to provide an automatic keyboard testing apparatus which allows a striking force applied to keys of the keyboard in test to be adjustable for suiting for different types of keyboards.

It is still further object of the present invention is to provide an automatic keyboard testing apparatus which is suitable for testing keyboards of different key layouts.

To achieve the above objects, in accordance with the present invention, there is provided an automatic keyboard testing apparatus comprising a pair of support arms fixed to a machine frame for supporting a keyboard to be tested therebetween. A clamping device secures the keyboard between the support arms. A test module comprises testing units for operating/testing pushbuttons, a knob and indictors of the keyboard. A key actuating device comprises a plurality of key depressing elements movably mounted thereto. Each key depressing element comprises a pressurized air stream outlet for applying a pressurized air stream to a corresponding key of the keyboard for actuating the key. A conveyor mechanism moves the key actuating device across the keyboard for sequentially actuating the keys of the keyboard. A keyboard coupling device electrically couples the keyboard to a processor-based determination device to receive signals therefrom for determining if the tested keyboard is properly functioning. A warning device is connected to the determination device for giving off a warning signal when the keyboard fails the test.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
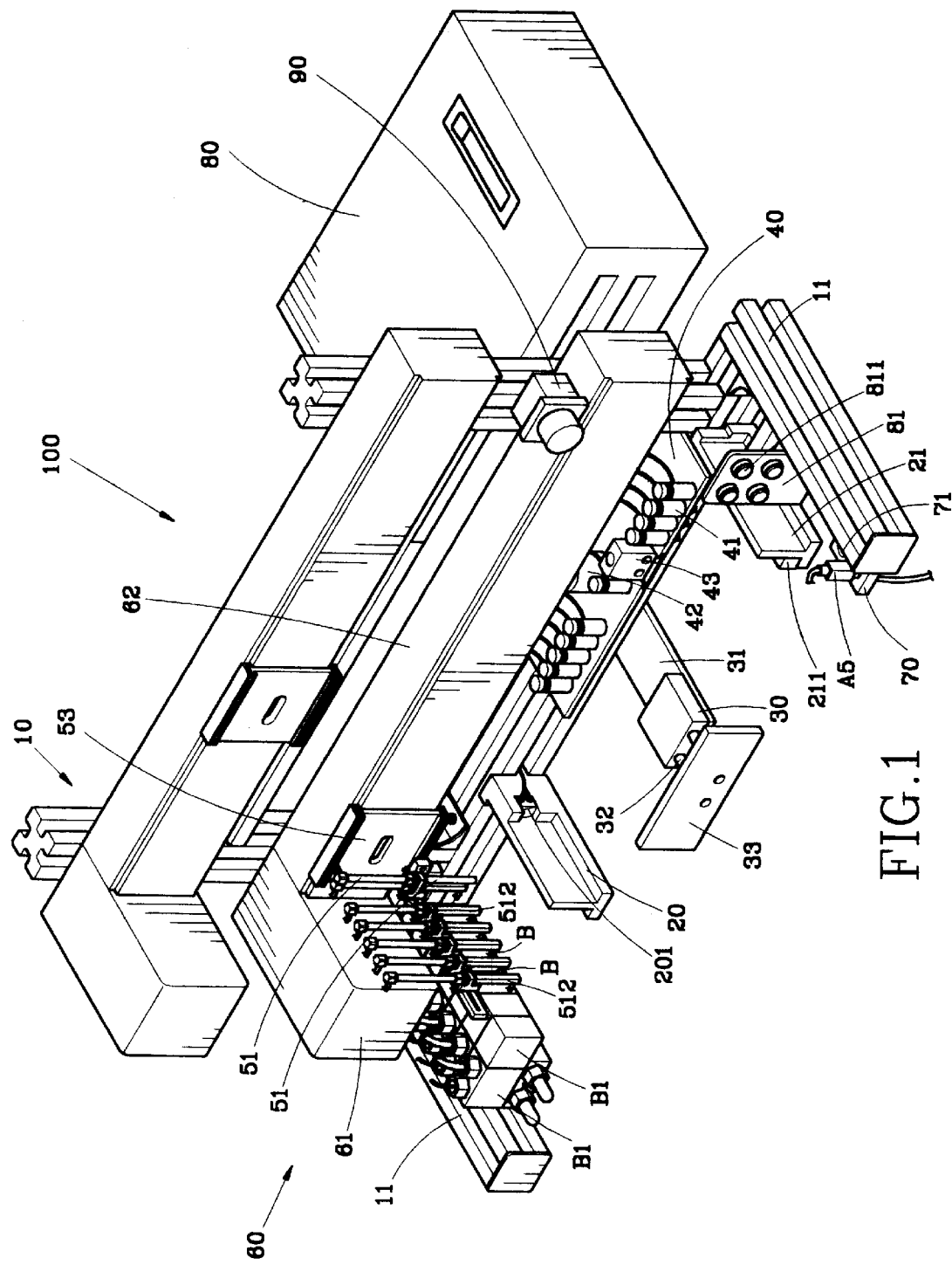
FIG. 1 is a perspective view of an automatic keyboard testing apparatus constructed in accordance with the present invention.
Figure 2:
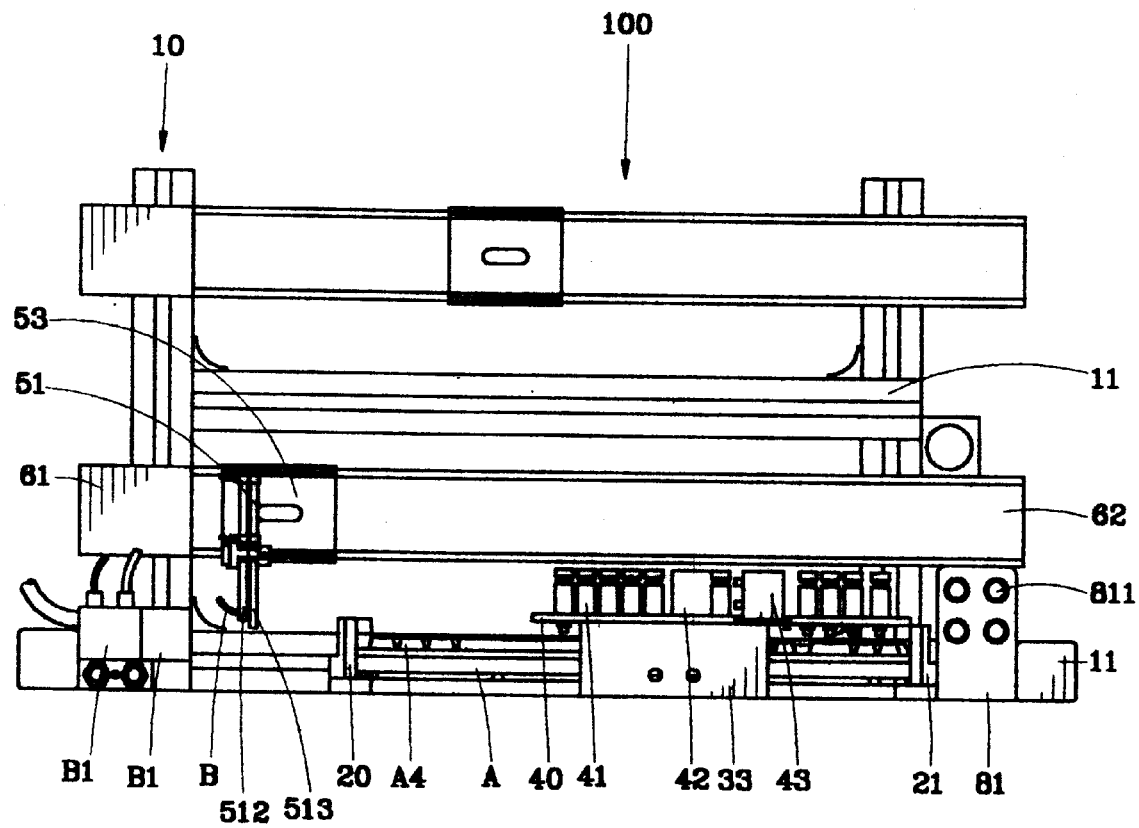
FIG. 2 is a front view of the automatic keyboard testing apparatus with a keyboard to be tested clamped therein.
Figure 3:
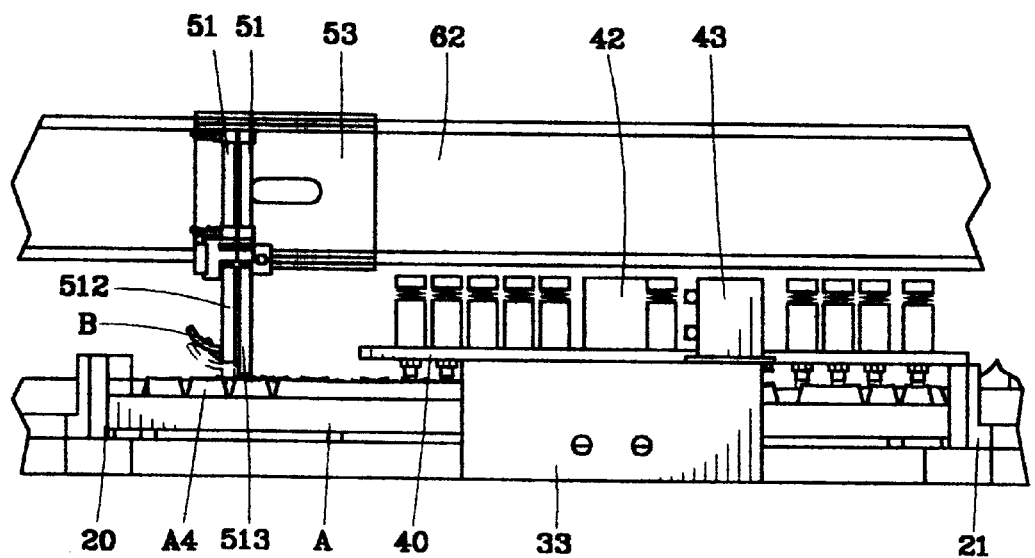
FIG. 3 is an enlarged partial front view of the automatic keyboard testing apparatus showing pressurized air stream is applied to actuate keys of the keyboard.

With reference to the drawings and in particular to FIGS. 1–3, wherein an automatic keyboard testing apparatus constricted in accordance with the present invention, generally designated by reference numeral 100, is shown, the automatic keyboard testing apparatus 100 comprises a machine frame 10 which may be made of any suitable material in any suitable form. In the embodiment illustrated, the machine frame 10 comprises a plurality of aluminum-extruded bars 11, including at least one longitudinal bar and two transverse bars mounted to the longitudinal bar to form a U-shape. The machine frame 10 further comprises two upright bars 11 mounted to and extending from the longitudinal bar 11 thereby being substantially normal to the longitudinal bar 11 and the transverse bars 11.

A pair of support arms 20, 21 are mounted to the longitudinal bar 11 and extending therefrom substantially parallel to the transverse bars 11. The support arms 20, 21 are spaced from each other for defining a space therebetween to accommodate a keyboard to be tested A (FIG. 2) which will be briefly referred to as the keyboard A. The support arms 20, 21 may have a cross-sectional shape corresponding to a cross-sectional shape of the keyboard A and capable to support the keyboard A thereon. The distance between the support arms 20, 21 are adjustable by moving the support aims 20, 21 with respect to each other for accommodating different sizes of different keyboards. Each support arm 20, 21 has a keyboard detecting sensor 201, 211 mounted thereon for detecting the keyboard A. Examples of the keyboard detecting sensor 201, 211 include micro-switch, proximity switch, photo-electrical switch, but not limited thereto.

A clamping device 30 is mounted to the longitudinal bar 11 for clamping and thus securing the keyboard A between the support arms 20, 21. In the embodiment illustrated, the clamping device 30 comprises a pneumatic cylinder mounted on a support plate 31 fixed to the longitudinal bar 11 of the machine frame 10. The support plate 31 is position-adjustable for positioning the clamping device 30 corresponding to different types of keyboard A. The pneumatic cylinder has driving rods 32 supporting a clamping pawl 33 on free ends thereof whereby when the pneumatic cylinder of the clamping device 30 is actuated by the detection of the keyboard A by the keyboard detecting sensors 201, 211 of the support arms 20, 21, the clamping pawl 33 is moved toward the longitudinal bar 11 thereby clamping and securing the keyboard A. The operation of the pneumatic cylinder of the clamping means 30 is controlled by the detection of the keyboard A by the keyboard detecting sensors 201, 211 of the support arms 20, 21.

Figure 4:
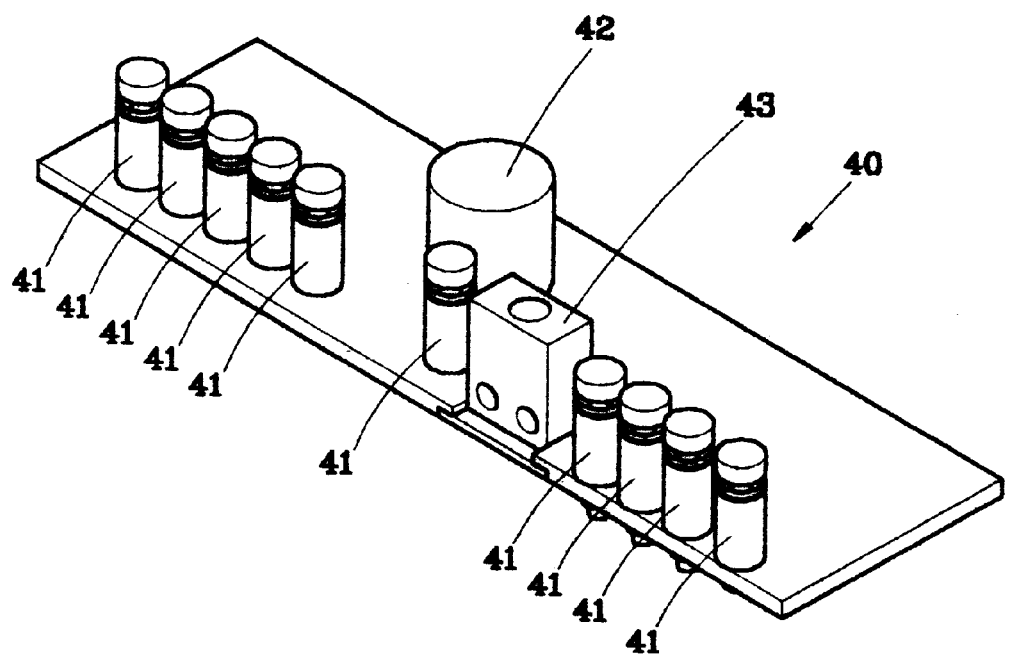
FIG. 4 is a perspective view of a test module of the automatic keyboard testing apparatus of the present invention.
Figure 5:
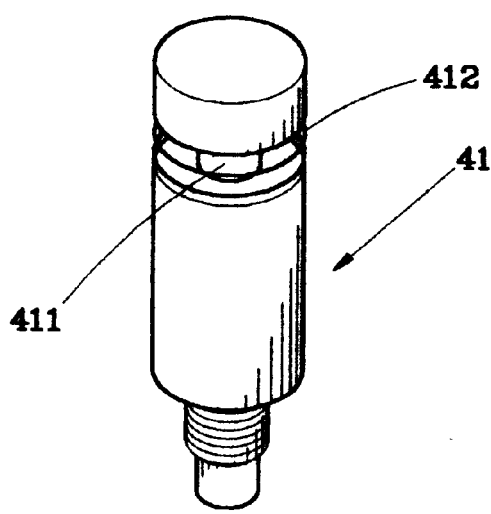
FIG. 5 is a perspective view of a pushbutton testing unit of the test module.

Further referring to FIGS. 4 and 5, the automatic keyboard testing apparatus 100 comprises a test module 40 detachably attached to and supported on the longitudinal bar 11 of the machine frame 10. The test module 40 may have different configuration corresponding to the particular keyboard A retained between the support arms 20, 21 for testing keyboards of different configuration. The test module 40 comprises a plurality of pushbutton testing units 41 as particularly shown in FIG. 5, a knob testing unit 42 and an indicator testing units 43. These testing units 41, 42, 43 are arranged in accordance with special function pushbuttons A1, a volume knob A2 and indicators A3 of the keyboard A (see FIG. 10) for selectively actuating the special function pushbuttons A1 and the volume knob A2 and detecting light emitted from the indicators A3 for testing purposes.

The pushbutton testing units 41 may be of any know construction provided that they are capable to depress and actuate the special function pushbuttons A1. In the embodiment illustrated and as shown in FIG. 5, each pushbutton testing unit 41 comprises an electromagnet which, when energized, moves a rod 411 in a downward direction to contact and depress the corresponding pushbutton A1. A returning spring 412 surrounds the rod 411 for returning the rod 411 back to the original position when the pushbutton testing unit 41 is de-energized.

The knob testing unit 42 comprises a motor having a toothed roller 421 (FIGS. 8 and 9) mounted to a spindle thereof for rotating therewith. The toothed roller 421 has a tooth periphery engaging with and rotating the volume knob A2 for testing volume control function of the knob A2.

The indicator testing unit 43 comprises a movable member (not labeled) driven by a pneumatic cylinder (not shown) with photo sensors 431 (FIG. 8) mounted thereon. The photo sensors 431 are moved toward the indicators A3 of the keyboard A by means of the movement of the movable member driven by the pneumatic cylinder and positioned proximate the indicators A3 for detecting light emitted from the indicators A3 when the indicators A3 are turned on. The arrangement of the photo sensors 431 on the movable member is accordance with the configuration of the indicators A3 of the particular keyboard A.

Figure 6:
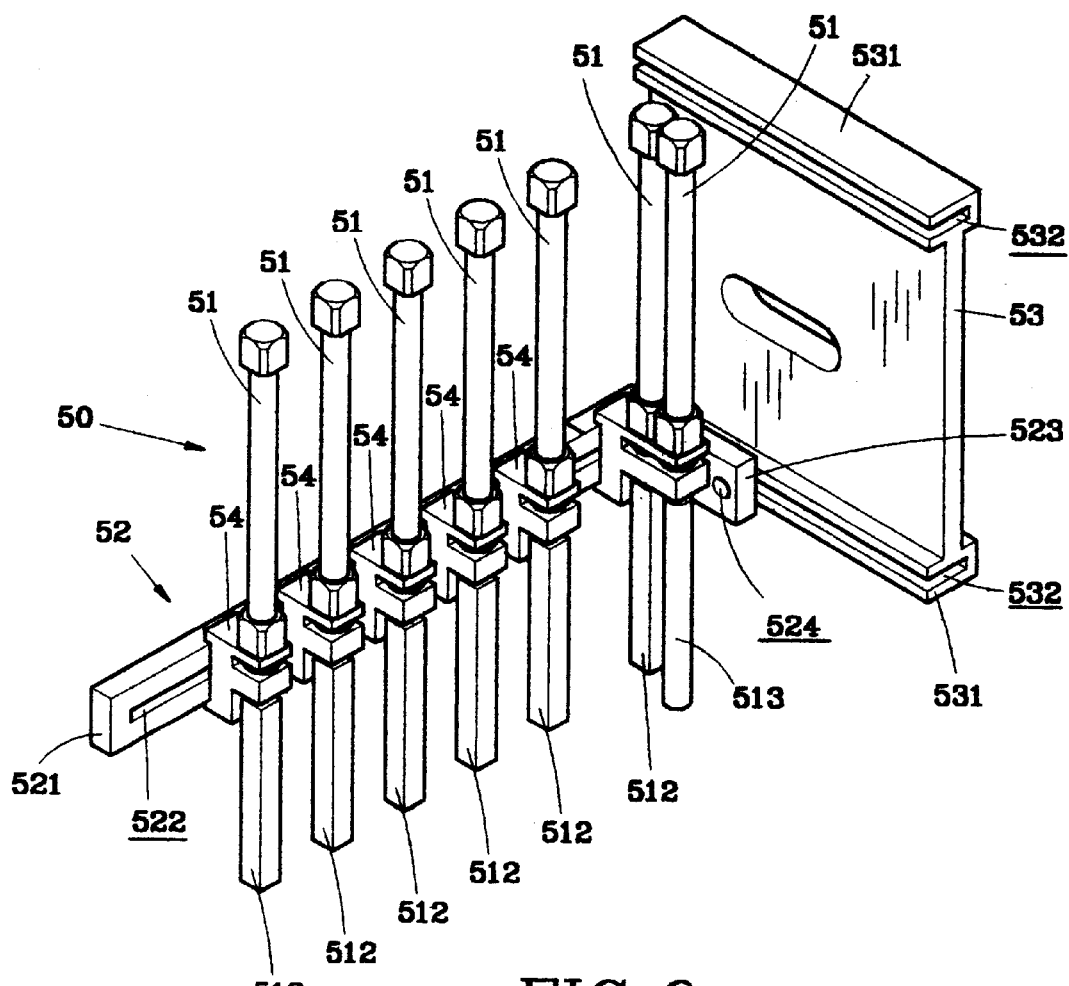
FIG. 6 is a perspective view of a key actuating device of the automatic keyboard testing apparatus of the present invention.
Figure 7:
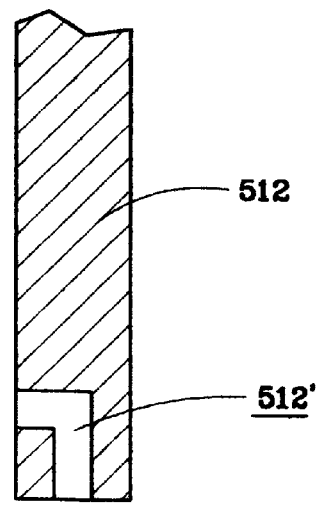
FIG. 7 is an enlarged sectional view of a pressurized air stream outlet member of the key actuating device.
Figure 10:
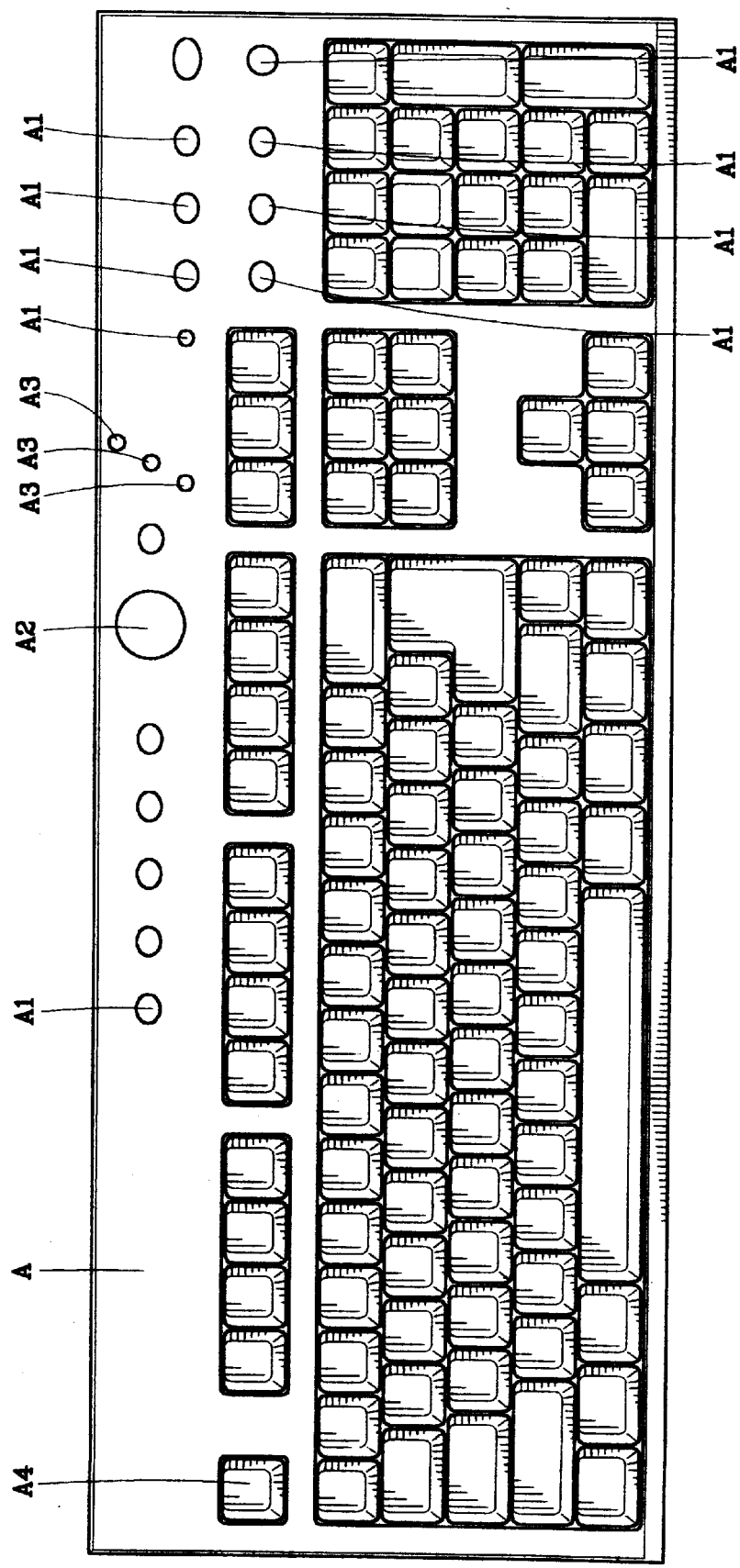
FIG. 10 is a top view of an example of the keyboard to be tested by the automatic keyboard testing apparatus of the present invention.

With reference to FIGS. 6 and 7, a key actuating device 50 is movably mounted to the machine frame 10 and comprises a number of key depressing element 51 position-adjustably supported thereon. The key depressing elements 51 may be of any known construction provided that they are capable to depress and actuate keys A4 of the keyboard A (FIG. 10). In the embodiment illustrated, each key depressing element 51 comprises a pneumatic cylinder having a movable rod 511. A pressurized air stream outlet member 512 is mounted to the rod 511 to be movable therewith. Each air stream outlet member 512 defines an L-shaped passage 512' to which a pressurized air conduit B is connected. The air conduit B is controlled by a air control element B1 to control timing of supplying pressurized air to the air passage 512' and the pressures inside the air passage 512'. The key depressing elements 51 are movable toward the corresponding keys A4 and pressurized air streams are applied thereto from the air passages 512' to actuate the keys A4.

The key actuating device 50 further comprises a depressing bar 513 which is fixed to the movable rod 511 of one of the key depressing element 51 and movable therewith for contacting and actuating pushbuttons A1 of the keyboard A that are located remote positions and cannot be actuated by the pushbutton testing units 41 of the test module 40. Each key depressing element 51 comprises a base member 54 for movably mounting the key depressing element 51 to the key actuating device.

The key actuating device 50 comprises a holder 52 having any desired form which in the embodiment illustrated is L-shaped comprising a first section 521 defining an elongate slot 522 for being engaged with and movably retaining the base members 54 of the key depressing elements 51 as shown in FIG. 6. The holder 52 also has a second section 523 defining a plurality of openings 524. A slide member 53 forms connecting sections 531 on opposite edges thereof Each connecting section 531 defines a recess 532. The openings 524 of the second section 523 of the holder 52 are secured to the recess 532 of one of the connecting sections 531 thereby mounting the holder 52 to the slide member 53. The holder 52 is position-adjustable corresponding to configuration and size of the particular keyboard A to be tested.

A conveying mechanism 60 (as shown in FIG. 1) is arranged behind the support arms 20, 21 and comprises a motor 61 drivingly coupled to a rail 62 for moving the rail 62. The rail 62 may be of any suitable form, such as that comprising a timing belt. The rail 62 is substantially parallel to the keyboard A and coupled to the connecting section 531 of the slide member 53 for moving the slide member 53 with the rail 62.

A keyboard coupling device 70 is fixed to one transverse bar 11 and comprises a number of different sockets 71 for selectively connecting an outlet plug A5 of the keyboard A as shown in FIG. 1. For example, the sockets 71 may be of ISA type and USB type. The connection device 70 receives output signals from the keyboard A and transmits the signals to determination means 80.

The determination means 80 may be any suitable configuration and form, such as a programmable logic control (PLC) or a personal computer, which receives indicator lighting signals from the test module 40 and key actuation signals from the keyboard coupling device 70 to determine if the special function pushbuttons A1, the volume knob A2 and the indicators A3 and the keys A4 function properly. The determination means 80 also generates a corresponding test result signal displayed on a status displaying device 81 to indicate the status of the keyboard A. The status displaying device 81 may be of any configuration and type, such as a plurality of indicating lamps 811 as shown in the drawings. Alternatively, the status displaying device 81 may be a monitor of a computer.

In case the keyboard A fails the test, the determination means 80 generates a driving signal to a warning device 90. The warning device 90 may be of any suitable form, such as a buzzer whereby when the driving signal is applied to the buzzer 90, an audio warning signal is generated to inform an operator of the automatic keyboard testing apparatus 100 of the failure of the keyboard A that is being tested.

Although not necessary, the determination means 80 controls the operations of the conveying mechanism 60 and the key actuating device 50 for coordinating the operations thereof and the testing process of the keyboard A.

Figure 8:
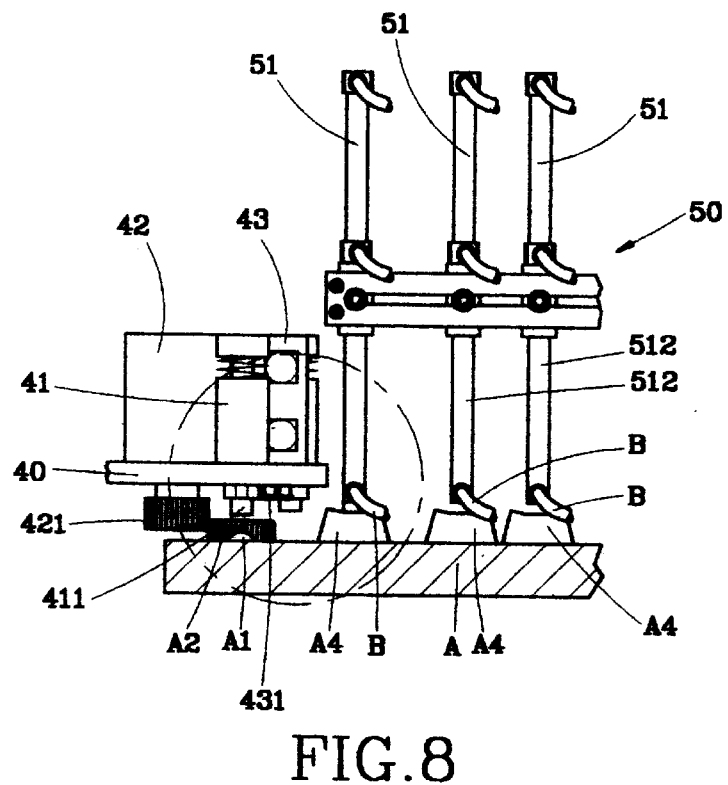
FIG. 8 is a partial side elevational view of the automatic keyboard testing apparatus showing a spatial relationship between the test module and the keyboard to be tested.
Figure 9:
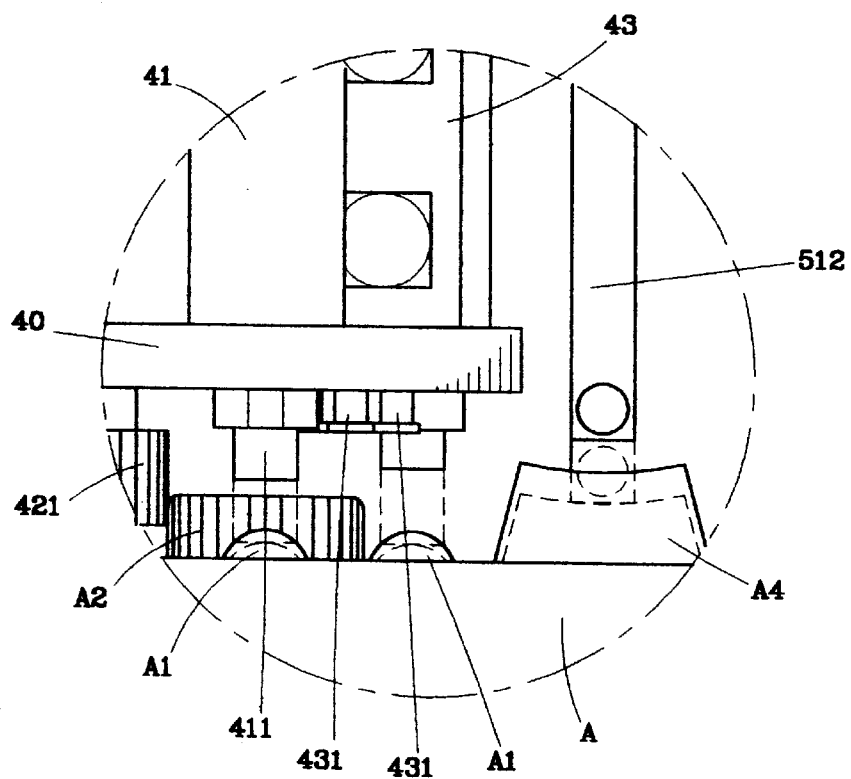
FIG. 9 is an enlarged view of the circled portion of FIG. 8.

Referring to FIGS. 8–10, in operation, a keyboard A is positioned between the support arms 20, 21 and a test module 40 corresponding to the particular keyboard A is selected and mounted to the machine frame 10. The keyboard detecting sensors 201, 211 of the support arms 20, 21 detect the keyboard A and actuate the clamping device 30 to secure the keyboard A. The indicators A3 are energized and the photo sensors 431 of the indicator testing unit 43 of the test module 40 detect light beams generated therefrom. If an abnormal situation is determined from ther received light beams, then the determination means 80 generates the warning signal through the warning device 90 and the status displaying device 81 shows the status of failure of the tested keyboard A. The test process is terminated and the operator of the automatic keyboard testing apparatus 100 is called by the warning signal to remove the keyboard A.

If the indicators A3 of the keyboard A pass the test, then the pushbutton testing units 41 and the knob testing unit 42 of the test module 40 and the key depressing elements 51 of the key actuating device 50 are actuated to test the special function pushbuttons A1, the volume knob A2 and the keys A4 (as shown in FIGS. 8 and 9). The keys A4 are actuated by the pressurized air streams from the pressurized air stream outlet members 512. The air pressure may be easily adjusted by means of the associated air control element B1 whereby the actuating or depressing force applied to the keys A4 are adjustable to suit for different types of keys A4. The determination means 80 gives off a warning signal to notify the operator once any one of the special function pushbuttons A1, the volume knob A2 and the keys A4 are found malfunctioning and the failure status is displayed on the status displaying device 81.

The key actuating device 50 is moved by the conveying mechanism 60 along the rail 62 to travel across the keyboard A and tests the keys A4 sequentially. Actuation signals of the keys A4 are transmitted to the determination means 80. A warning signal is given off via the warning device 90 and the status display device 81 when one of the keys A4 malfunctions and the test is terminated. Data related to the unsuccessful test is stored in the determination means 80 for further processing when repairing and adjustment of the malfunctioning keys A4. This provides an automatic test process.

Figure 11:
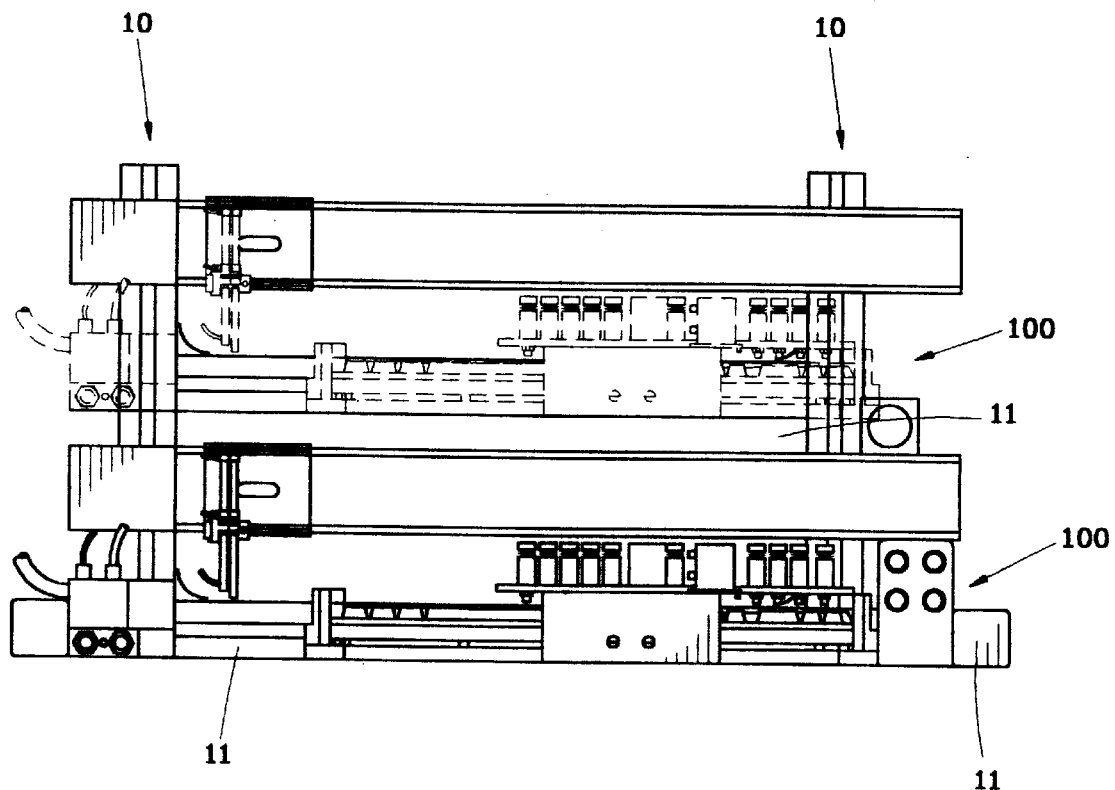
FIG. 11 is a front view showing an automatic keyboard testing apparatus in accordance with a second embodiment of the present invention.

Referring to FIG. 11, a second embodiment of the automatic keyboard testing apparatus in accordance with the present invention is shown, wherein two sets of testing facility are mounted to the machine frame 10 and spaced from each other for each receiving and independently testing a keyboard A. Thus, two keyboards may be tested at the same time. Furthermore, the keyboards may be different types whereby a more efficient and more effective way of testing keyboards may be obtained.

Although the present invention has been described with respect to preferred embodiments, it is contemplated that a variety of modifications, variations and substitutions may be done without departing from the scope of the present invention that is intended to be defined by the appended claims.

What is claimed is:

1. An automatic keyboard testing apparatus comprising:
   at least one pair of support arms adapted to support a keyboard to be tested therebetween;
   clamping means for clamping and securing the keyboard on the support arms;
   a test module comprising pushbutton testing units, at least one knob testing unit and one indicator testing unit respectively corresponding to pushbuttons, a knob and indicators of the keyboard for testing the pushbuttons, the knob and the indicators;
   key actuating means comprising key depressing elements each having a movable rod to which a pressurized air stream outlet member is attached, each pressurized air stream outlet member being adapted to connect to a pressurized air source to receive pressurized therefrom;
   conveying means comprising a rail for moving the key actuating means across the keyboard whereby a pressurized air stream from each pressurized air stream outlet member is applied to each key of the keyboard for actuating the key;
   keyboard coupling means electrically coupled to the keyboard for receiving key actuation signals, pushbutton actuation signals and knob actuation signal therefrom;
   determination means for receiving indicator lighting signals from the indicator testing units and the key actuation signals, the pushbutton actuation signals and the knob actuation signal from the keyboard coupling means to determine if the indicators, the keys, the pushbuttons and the knob function properly; and
   warning means driven by the determination means to given off a warning signal when any one the indicators, the keys, the pushbuttons, and the knob is not functioning properly.

2. The automatic keyboard testing apparatus as claimed in claim 1, wherein the support arms, the clamping means, the test module, the key actuating means, the conveying means, the keyboard coupling means, the determination means and the warning means are fixed to a machine frame.

3. The automatic keyboard testing apparatus as claimed in claim 2, wherein the machine frame is comprised of aluminum-extruded bars.

4. The automatic keyboard testing apparatus as claimed in claim 3, wherein the support arms are positioned in front of the machine frame and fixed to a longitudinal bar of the machine frame.

5. The automatic keyboard testing apparatus as claimed in claim 1, wherein a keyboard detecting sensor is arranged on each support arm for detecting the keyboard.

6. The automatic keyboard testing apparatus as claimed in claim 5, wherein the keyboard detecting sensor is selected from the group comprising micro-switch, proximity switch and photo-electrical switch.

7. The automatic keyboard testing apparatus as claimed in claim 1, wherein the clamping means comprises a driving rod having a free end to which a clamping pawl is fixed for moving relative to the keyboard thereby clamping the keyboard.

8. The automatic keyboard testing apparatus as claimed in claim 7, wherein the keyboard clamping means comprises a pneumatic cylinder.

9. The automatic keyboard testing apparatus as claimed in claim 1, wherein the indicator testing unit of the test module comprises photo sensors for detecting light emitting from the indicators of the keyboard to generate the indicator lighting signal.

10. The automatic keyboard testing apparatus as claimed in claim 1, wherein each pushbutton testing unit of the test module comprises an electromagnetic element.

11. The automatic keyboard testing apparatus as claimed in claim 1, wherein the knob testing unit comprises a motor.

12. The automatic keyboard testing apparatus as claimed in claim 11, wherein a toothed roller is fixed to a spindle of the knob testing unit for engaging with and rotating the knob of the keyboard.

13. The automatic keyboard testing apparatus as claimed in claim 1, wherein each pressurize air stream outlet member defines an air passage therethrough to which the pressurized air source is connected.

14. The automatic keyboard testing apparatus as claimed in claim 1, wherein the key actuating means further comprises a depressing bar for selectively depressing the special function pushbuttons.

15. The automatic keyboard testing apparatus as claimed in claim 1, wherein each key depressing element is movably attached to the key actuating means by a base member.

16. The automatic keyboard testing apparatus as claimed in claim 1, wherein keyboard actuating means comprises an L-shaped holder.

17. The automatic keyboard testing apparatus as claimed in claim 16, wherein the holder comprises a first section defined an elongate slot.

18. The automatic keyboard testing apparatus as claimed in claim 17, wherein each key depressing element is comprises a base member movably mounted in the slot.

19. The automatic keyboard testing apparatus as claimed in claim 16, wherein the holder comprises a first section and a second section, a slide member being movably attached to the second section and coupled to the rail of the conveying means for mechanically coupling the holder of the key actuating means to the conveying means.

20. The automatic keyboard testing apparatus as claimed in claim 1, wherein the conveying means comprises a motor for driving the rail.

21. The automatic keyboard testing apparatus as claimed in claim 1, wherein the keyboard coupling means comprises a number of sockets corresponding to keyboard plugs of different types.

22. The automatic keyboard testing apparatus as claimed in claim 1, wherein the determination means comprises a programmable logic control.

23. The automatic keyboard testing apparatus as claimed in claim 1, wherein the determination means comprises a personal computer.

24. The automatic keyboard testing apparatus as claimed in claim 1, wherein the warning means comprises a buzzer.

* * * * *